United States Patent [19]
Hartman

[11] Patent Number: 5,880,409
[45] Date of Patent: Mar. 9, 1999

[54] ONBOARD WEIGHING SYSTEM FOR TRUCK HAVING SINGLE POINT SUSPENSION

[75] Inventor: James M. Hartman, Kent, Wash.

[73] Assignee: Weighst Systems, Inc., Kent, Wash.

[21] Appl. No.: 755,137

[22] Filed: Nov. 20, 1996

[51] Int. Cl.$^6$ ................................................. G01G 19/02
[52] U.S. Cl. ................................................................. 177/137
[58] Field of Search .................................... 177/136, 137, 177/138, 211

[56] References Cited

U.S. PATENT DOCUMENTS

| | | | |
|---|---|---|---|
| 4,042,049 | 8/1977 | Reichow et al. .......................... | 177/137 |
| 4,287,958 | 9/1981 | Schmidt .................................... | 177/136 |
| 4,364,279 | 12/1982 | Stern et al. ............................... | 177/211 |

OTHER PUBLICATIONS

Yorgiadis, The Shear Pin Force Transducer, Striansert Company, West Conschohocken, PA, May, 1979.
Hutchens Industries, H–900 Single Point Suspension Series, Springfield, MO, Sep. 1992.

Primary Examiner—Randy W. Gibson
Attorney, Agent, or Firm—Richardson & Folise

[57] ABSTRACT

A trunnion mount single point vehicle suspension including a load monitoring apparatus. The suspension includes a trunnion shaft, means for attaching the shaft to a vehicle frame and an axle spring assembly mounted to the trunnion shaft and spaced from the attachment means. It also includes strain measuring means mounted in the trunnion shaft between the attaching means and the axle spring assembly for measuring changes in the shaft. In one embodiment the means for attaching the trunnion shaft to the vehicle frame is a trunnion hanger mounted inboard of the axle spring assembly. In another embodiment the attaching means is a clevis bracket which straddles the axle spring assembly. Also disclosed is a load monitoring apparatus for measuring the weight imposed by the trailer at its mounting point on the tractor. The apparatus includes at least one pin load cell having spaced shear strain measuring means and trailer mounting means attached to the pin cell intermediate the shear strain measuring means.

14 Claims, 5 Drawing Sheets

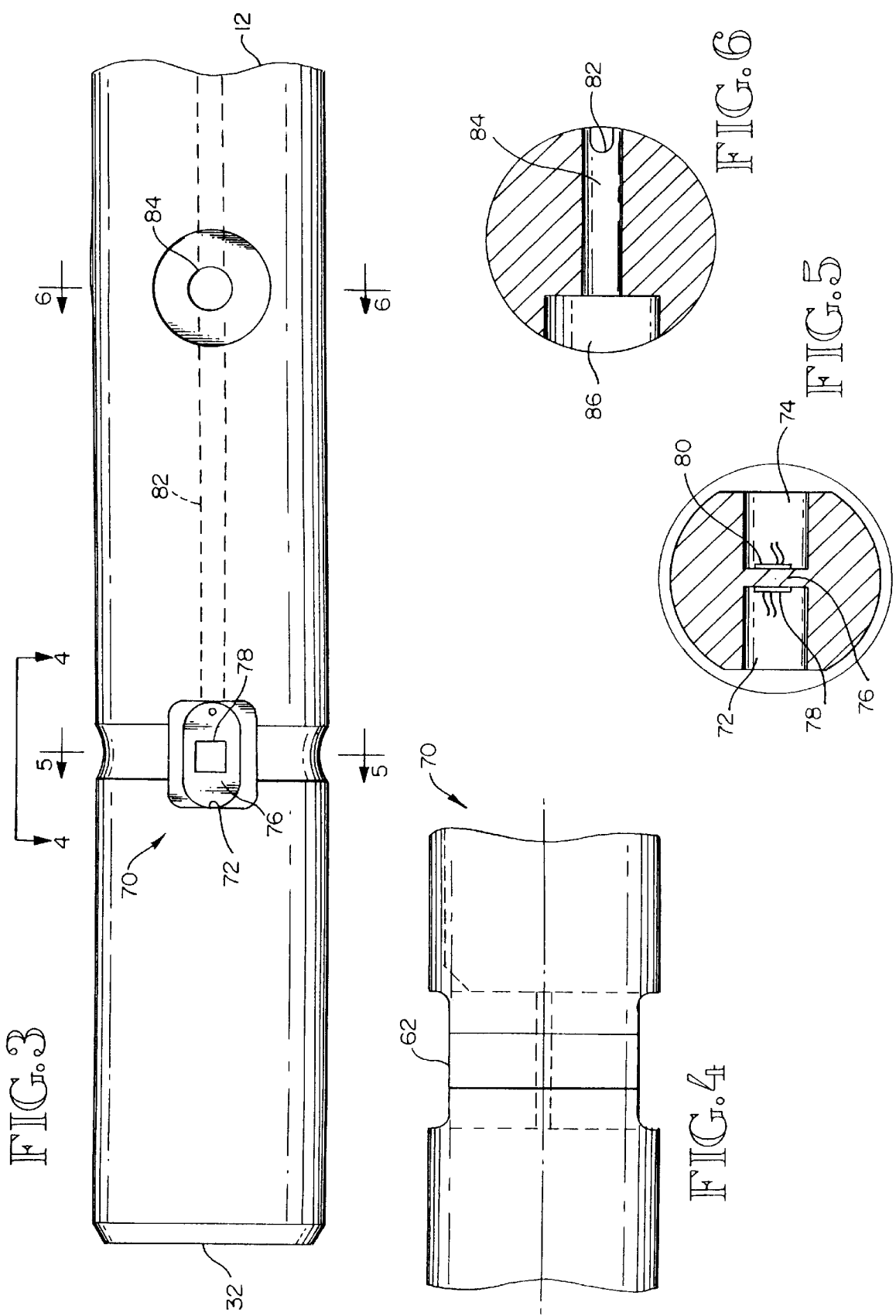

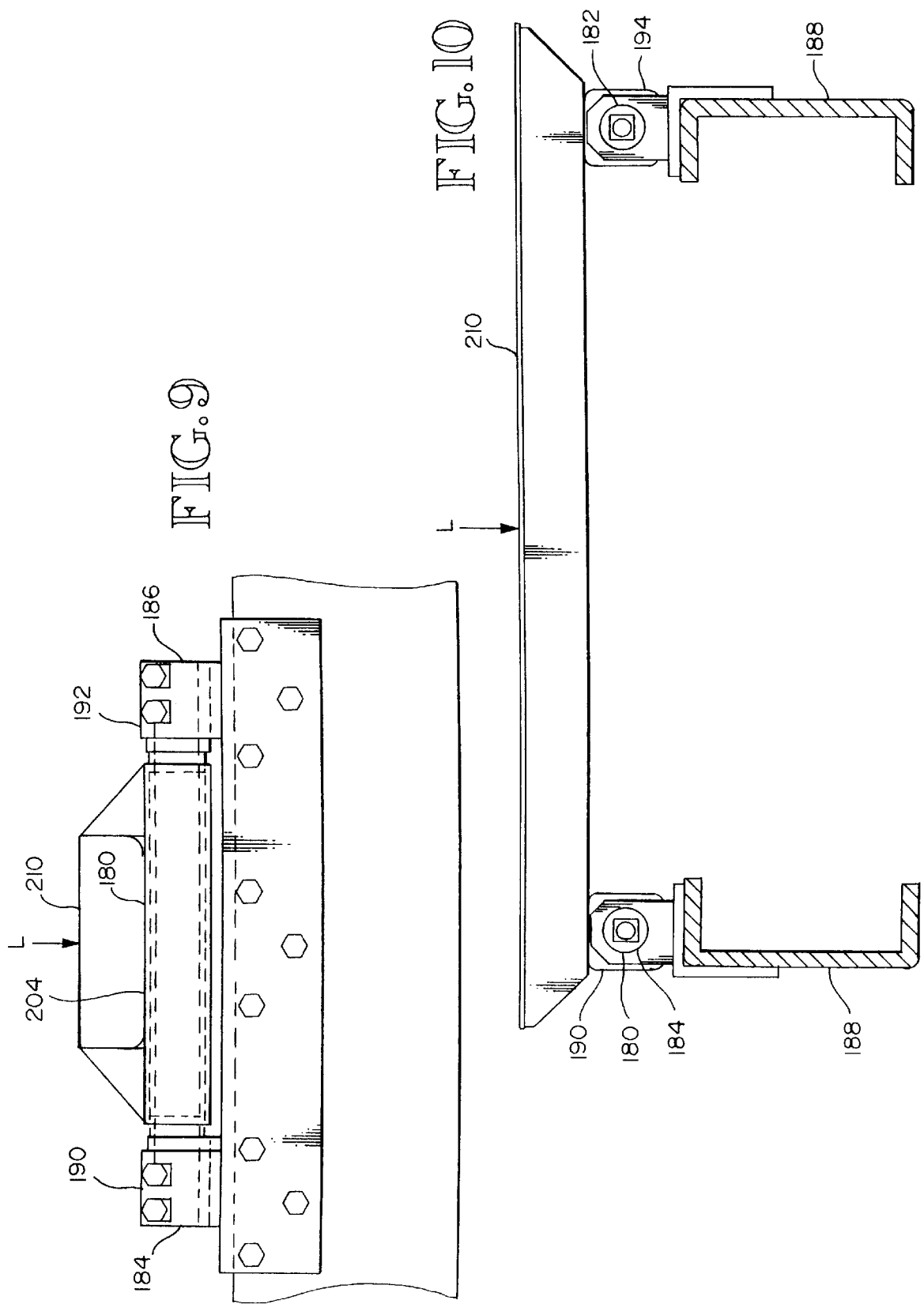

ONBOARD WEIGHING SYSTEM FOR TRUCK HAVING SINGLE POINT SUSPENSION

BACKGROUND OF THE INVENTION

This invention relates generally to weighing systems for vehicles and more particularly to an onboard weighing system for a truck-trailer combination in which the trailer utilizes a single point suspension. The invention also relates particularly to an onboard weighing system for measuring the load imposed on a fifth-wheel table or log truck bunk by the trailer.

In the trucking business profitable operation usually requires making optimal use of the vehicle and such use requires carrying as much load as possible. However, care must be exercised in loading a truck because the weight of a commercial vehicle operating on the highways must be known for safety reasons and for compliance with state and federal weight regulations. Those regulations specify the maximum total vehicle weight and maximum weight per axle for a wide variety of vehicle categories. If a vehicle is found to be in violation of those regulations the operator can be fined and can be required to reposition or remove cargo from the vehicle to bring it into compliance. Such violations can be costly and can seriously disrupt shipping schedules.

The most common device used for weighing trucks is a platform scale. Such scales are installed at official state weighing stations and are also available at privately operated service centers. Also many companies choose to install platform scales at their distribution centers for their own convenience. In order to weigh a truck the operator drives one axle at a time, or the entire vehicle if possible, onto the scale and the weights are noted. If each axle is weighed then the total weight (or gross weight) of the truck is then determined by adding the total of the axle weights. The weight of the vehicle's cargo can then be determined by subtracting the vehicle's empty weight (or tare weight) which is normally known beforehand, from the gross weight.

Although platform scales are quite accurate they are also relatively expensive to install. As a result, many shippers do not have them available on their premises, requiring operators to load the vehicles based on their estimates of the cargo weight. Then the operator must drive the vehicle to a scale installation at a remote location in order to weight it. If the vehicle is too heavy he must return to the shipper and off-load cargo. If the vehicle is underweight he must choose between returning for additional load or driving the vehicle with unused capacity. Obviously having to rely on guess-work in loading the vehicle can result in lost time and lost profit and is therefore undesirable.

Because of the disadvantages associated with fixed platform scales many operators now use portable scales in loading operations. Typically the scales are used in pairs with one scale being placed under each set of opposing wheels on an axle to obtain axle weight. After the vehicle has been loaded with the desired weight of cargo by estimate, it is then driven over the portable scales one axle at a time much in the same manner as done with the fixed platform scales. While these scales function reasonably well they have a number of disadvantages. First, unless the scales belong to the shipper the operator must carry them about in the vehicle which consumes additional weight and space. Secondly, they require the same time consuming loading process as do fixed platform scales where the vehicle is first loaded by estimate and then the load is adjusted to reach the desired actual weight. Further, some portable scales require that the vehicle tires be carefully positioned on the platform in order to obtain accurate weight readings which increases the time involved in the weighing process.

Because of the disadvantages associated with both fixed and portable platform scales a number of "onboard" weighing systems have been developed for trucks. Typically the design of such systems is based upon the theory that an increase of the weight of a vehicle will result in a proportional increase in the deflection or strain in certain structural members of the vehicle. In systems which correlate strain with load, strain changes in components of interest are normally measured using strain gages mounted on the surface of the components as is well known in the art. These systems were eagerly received by the industry because they offered the promise of providing instantaneous load information to an operator and appeared to eliminate most of the undesirable characteristics associated with platform scales. Unfortunately, most onboard systems found in the prior art have failed to live up that promise, not because of any fault in their underlying theory but because of deficiencies associated with implementation of the theory. For example, some systems relied on bending strain measurements from the vehicle's axles but these measurements proved to be an unreliable indicator of vehicle load. Such inaccuracies resulted from the fact that while axle bending strain was dependant upon load it was also dependent to some degree on the interface between the tires and the roadway.

Other systems relied upon strain measurements on components positioned between the vehicle's suspension and frame. While such systems provided more reliable load information they required expensive modifications to the vehicles. Some of these systems also experienced unacceptable rates of structural failure and required an undesirable increase in vehicle height. The displacement measuring systems found in prior art have also exhibited a number of significant disadvantages. For example, although component displacement may be dependent upon vehicle load it may also be dependent upon friction between components and wear of those components. Moreover, such systems often require expensive modifications in order to retrofit them to existing vehicles.

Accordingly, it is an object of this invention to provide for an onboard weighing system for trucks which is reliable and accurate.

It is a further object of this invention to provide for such an onboard weighing system which can be retrofitted to existing vehicles with minimal modifications and at a reasonable expense.

It is a further object of this invention to provide for such an onboard weighing system which is light in weight and compact so as not to significantly reduce the cargo volume or cargo carrying capacity of vehicles on which it is installed.

SUMMARY OF THE INVENTION

The invention can be summarized as broadly providing for a single point vehicle suspension including a load monitoring apparatus. The new suspension includes a trunnion shaft, means for attaching the shaft to a vehicle frame, an axle spring assembly mounted to the trunnion shaft and spaced from the attaching means, and means for measuring changes in shear strain in the shaft mounted in between the attaching means and the axle spring assembly.

In one embodiment of the invention the means for attaching the trunnion shaft to the vehicle frame is a trunnion hanger mounted inboard of the axle spring assembly. In another embodiment the means for attaching is a clevis bracket having inner and outer arms, each of which is attached to the trunnion shaft, and the axle spring assembly is mounted to the shaft in between the arms. In accordance with a more detailed aspect of the invention, the trunnion shaft includes strain isolation means located between the axle spring assembly and the means for attaching.

The invention can also be described as providing for a load monitoring apparatus for measuring the weight imposed by the trailer at its mounting point on the tractor. That weight is typically imposed on a fifth-wheel assembly or a log bunk. The apparatus includes at least one pin load cell having spaced shear strain measuring means, means for mounting the cell to the vehicle frame, and trailer mounting means attached to the pin cell intermediate the shear strain measuring means.

BRIEF DESCRIPTION OF THE DRAWINGS

FIG. 3 is a front view of a portion of the trunnion shaft of FIG. 1.

FIGS. 4, 5 and 6 are sectional views taken at 4—4, 5—5 and 6—6 as shown in FIG. 3.

FIG. 9 is a left side view of a third embodiment of the present invention.

FIG. 10 is a front view of the embodiment of FIG. 9.

DETAILED DESCRIPTION OF THE PREFERRED EMBODIMENTS

The novel features believed to be characteristic of this invention are set forth in the appended claims. The invention itself, however, may be best understood and its various objects and advantages best appreciated by reference to the detailed description below in connection with the accompanying drawings.

Figure 1:
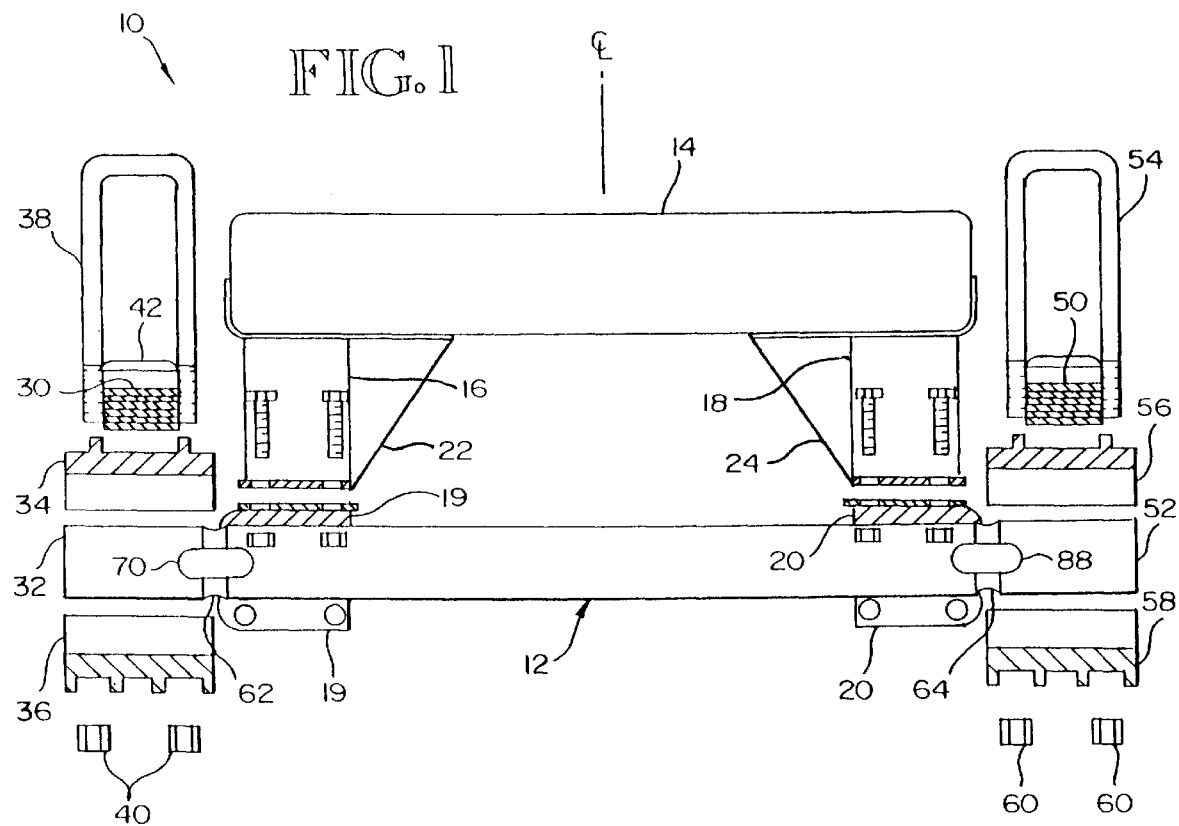
FIG. 1 is a front view, partially in sections and exploded, of a first embodiment of the subject invention.
Figure 2:
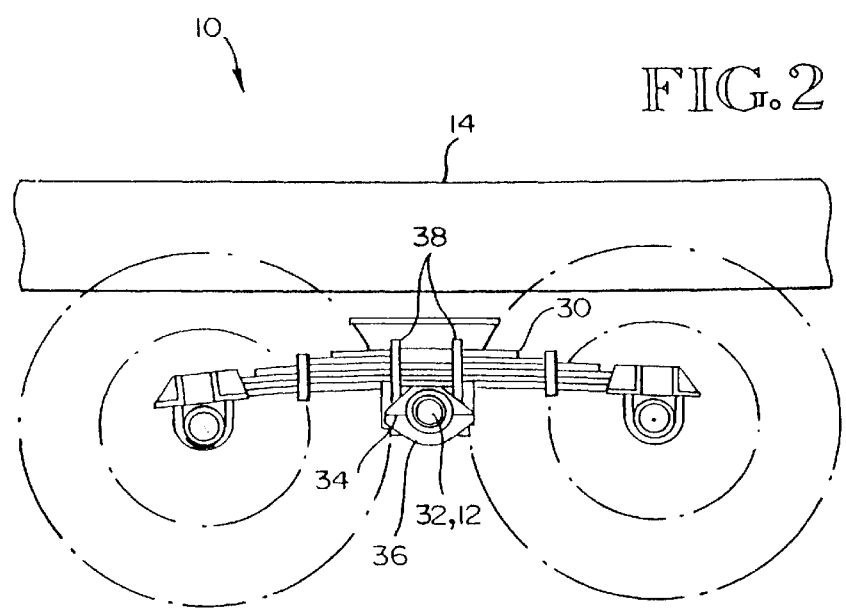
FIG. 2 is a left side view of the embodiment of FIG. 1.

FIGS. 1 through 6 illustrate a cantilever type trunnion mount single point suspension including an onboard weighing system constructed in accordance with the teachings of the present invention and generally designated by the number 10. FIG. 1 illustrates a front view, partially exploded and in section, of such a suspension. Referring to that Figure it can be seen that the suspension includes trunnion beam 12 which is suspended from vehicle trailer frame 14 by trunnion hangers 16 and 18. The trunnion hangers are clamped to the trunnion shaft by brackets 19 and 20, respectively, and a number of bolts as shown. Additional lateral support for the trunnion hangers is provided by gussets 22 and 24 which are welded to the sides of the trunnion hangers and to the underside of the vehicle frame as shown. Overslung axle spring assembly 30 is clamped to outer end 32 of trunnion shaft 12 by means of trunnion hub tipper and lower halves 34 and 36 together with U-bolt 38 and nuts 40 as indicated. The U-bolt is cushioned against the spring assembly by spring top pad 42. Similarly, axle spring assembly 50 is clamped to right hand end 52 of the trunnion shaft by U-bolt 54, trunnion hub upper and lower halves 56 and 58, and nut 60.

Significant features of trunnion shaft 12 are strain isolation grooves 62 and 64 which are circumferentially formed in the shaft. It should be noted that when trunnion hub halves 34 and 36 and trunnion shaft mounting bracket 19 are clamped to the trunnion shaft they each partially overlap isolation groove 62 but remain spaced apart. Similarly, trunnion mounting bracket 20 and trunnion hub halves 56 and 58 are spaced apart when clamped to the shaft but partially overlap isolation groove 64.

Another significant aspect of the subject invention is illustrated in FIGS. 3 through 6. Those Figures show the left hand portion of trunnion shaft 12 which includes a shear measurement section generally designated by the number 70. Shear load cells are well known in the art so measurement section 70 will be described only briefly. Referring to FIGS. 3 through 6 it can be seen that bores 72 and 74 are formed in shaft 12 and are separated by centrally disposed shear web 76. Strain gages 78 and 80 are mounted on opposing sides of the shear web in the conventional fashion. Electrical leads from the gages are extended through recess 82 to connector cavity 84 where they are joined to a conventional outlet connector (not shown) located in recess 86. Shear measurement 88 located on the right hand end of trunnion shaft 12 is substantially identical in construction to measurement section 70. For greater detail on shear beam load cells the reader is referred to U.S. Pat. No. 4,364,279 issued to Harry Stern et al. on Dec. 21, 1982.

In operation vertical load on the vehicle frame is transmitted to the trunnion shaft through trunnion hanger 16 and 18. Then it passes through the shaft, primarily a shear load, into the trunnion hubs through the springs and finally to the tires. Those resulting shear loads result in deformations in the strain gages in measurement sections 70 and 88 which are converted into weight readings by the apparatus illustrated in FIG. 12 and discussed below.

Figure 7:
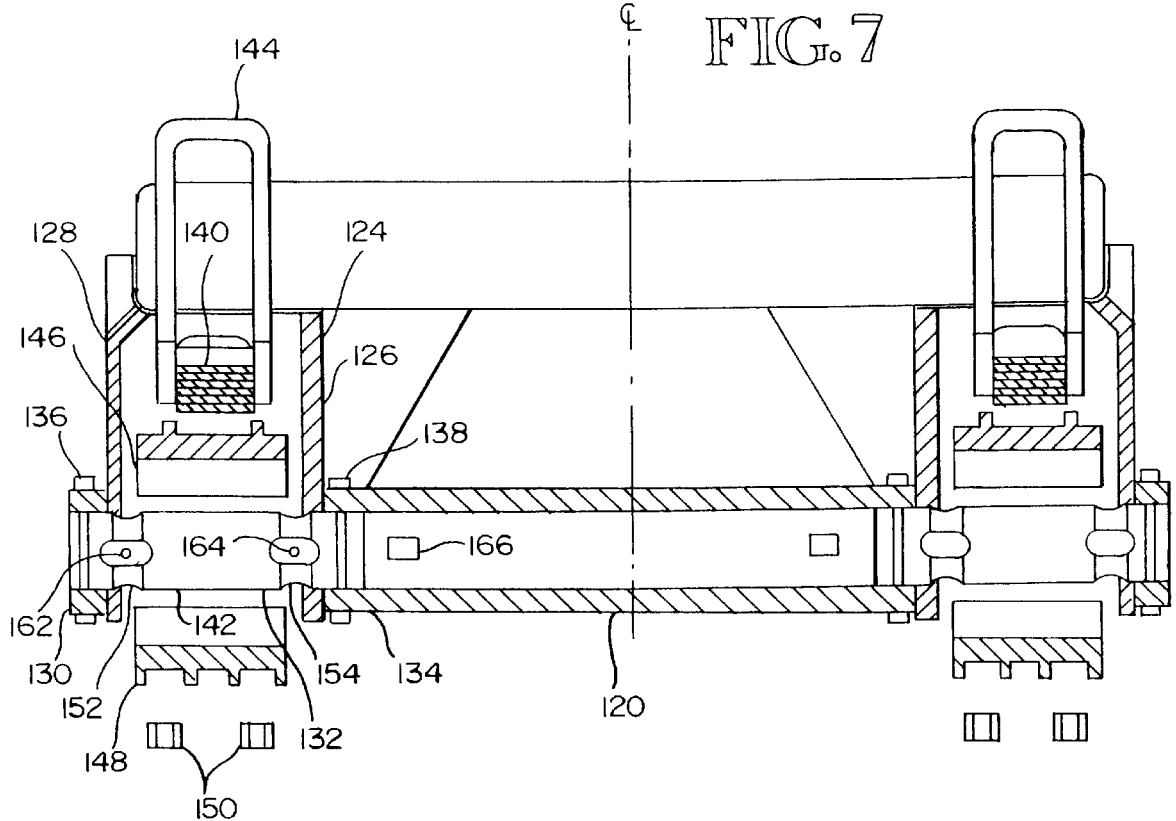
FIG. 7 is a front view, partially cut away and exploded, of a second embodiment of the present invention.
Figure 8:
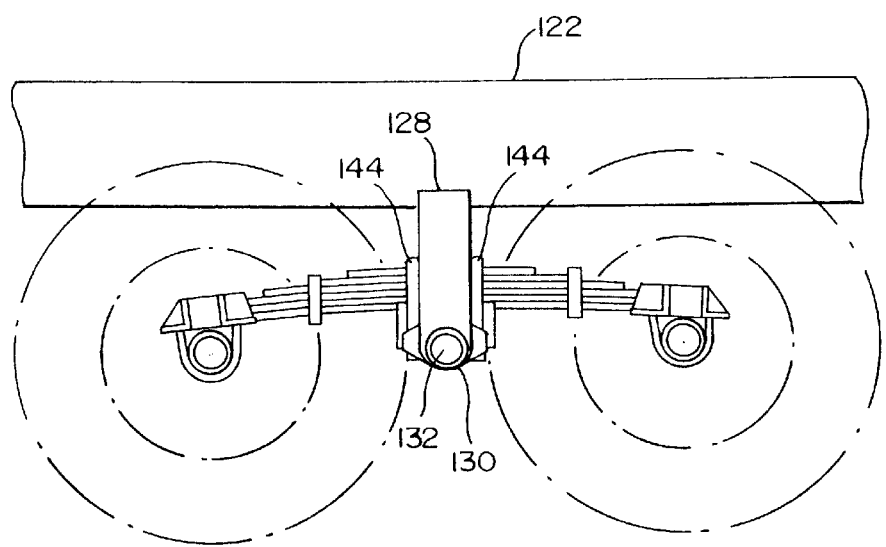
FIG. 8 is a left side view of the embodiment of FIG. 7.

FIGS. 7 and 8 illustrate a second embodiment of the present invention. One of the principle differences between this embodiment and the first one is the means by which the trunnion shaft is attached to the vehicle frame. Referring to FIG. 7 it can be seen that the trunnion shaft 120 is attached to vehicle frame 122 by trunnion clevis 124 which includes inner arm 126 and outer arm 128. Inner arm 126 which is welded to the vehicle frame at its upper end and to the trunnion shaft at its lower end as shown. Outer arm 128 is welded to the vehicle frame at its upper end and welded at its lower end to cylindrical support boss 130. Shear pin load cell 132 is inserted through support boss 130, through circular cutouts in the outer and inner arms of the trunnion clevis and into end 134 of trunnion shaft 120 where it is fixed in place by bolts 136 and 138. Axle spring leaf assembly 140 is clamped to center section 142 of pin load cell 132 by U-bolt 144, upper and lower trunnion hub halves 146 and 148, respectively, and bolts 150. Circumferencial strain isolation grooves 152 and 154 in the load cell are positioned such that when the cell is installed as shown inner and outer arms 124 and 128 slightly overlap them. It should be noted that each of the trunnion halves when clamped to the load cell is centrally disposed between the isolation grooves, slightly overlapping each of them but is spaced apart from arms 124 and 126. Strain measurement means 162 and 164, preferably strain gages, are mounted to load cell 132 in structure very similar to that employed in measurement section 70 in the first embodiment. Also they are positioned axially along the trunnion shaft so as to be centrally disposed with respect to strain relief grooves 152 and 154. It should be understood that this embodiment is symmetrical about the vertical center line of the vehicle so right hand components will not be described in detail.

In operation weight imposed on vehicle frame 122 passes downward through the inner and outer arms of both clevis hangers where it is transmitted into the pin cells primarily as shearing force. It is then transferred from the pin cells into the trunnion hubs to the springs and finally to the tires. Shearing loads in the shear measurement sections in deformations of strain gages 162 and 164 which in turn result in changes in electrical output of the gages. Those outputs are converted by the apparatus shown in FIG. 12 into weight readings as will be discussed below.

Figure 11:
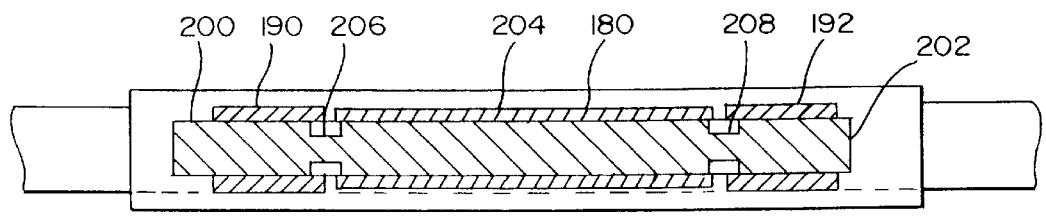
FIG. 11 is a partial top view, partially cut away, of the embodiment of FIG. 9.

A third embodiment of the invention is illustrated in FIGS. 9 through 11. The purpose of this embodiment is to provide measurement of the weight imposed by the truck trailer on the tractor at their point of attachment. Referring to those Figures it can be seen that this embodiment includes a pair of generally cylindrical parallel oriented shear pin load cells 180 and 182. Load cell 180 is mounted at its opposing ends 184 and 186 to tractor frame 188 by mounts 190 and 192. In a similar manner pin cell 182 is mounted to the tractor frame by mounts 194 and 196 (not shown).

FIG. 11 shows a partial cutaway view of cell 180. In that view it can be seen that the cell includes outer sections 200 and 202 which are joined to center section 204 by shear webs 206 and 208, respectively. Each of those shear webs is constructed in a manner very similar to that of shear web 76 of embodiment one. Strain gages (not shown) are mounted on opposing surfaces of each of these webs to measure shear strain in the webs. Pin cell 182 is constructed in a substantially identical manner. Referring again to FIGS. 9 and 10 it can be seen that this embodiment also includes fifth wheel table 210 which is mounted to the top of center section 204 of pin cell 180. It is also mounted to the center section of pin cell 182 in a similar manner.

In operation it can be seen that when weight "L" is imposed by the trailer on fifth wheel table 210 it is transferred to the center sections of pin cells 180 and 182 generating significant shear loads in shear webs 206 and 208 of pin cell 180 and the corresponding webs of pin cell 182. By summing the outputs of the strain gages mounted on all four webs a change in the load imposed on fifth wheel table 210 can be accurately indicated by the apparatus described in FIG. 12.

Figure 12:
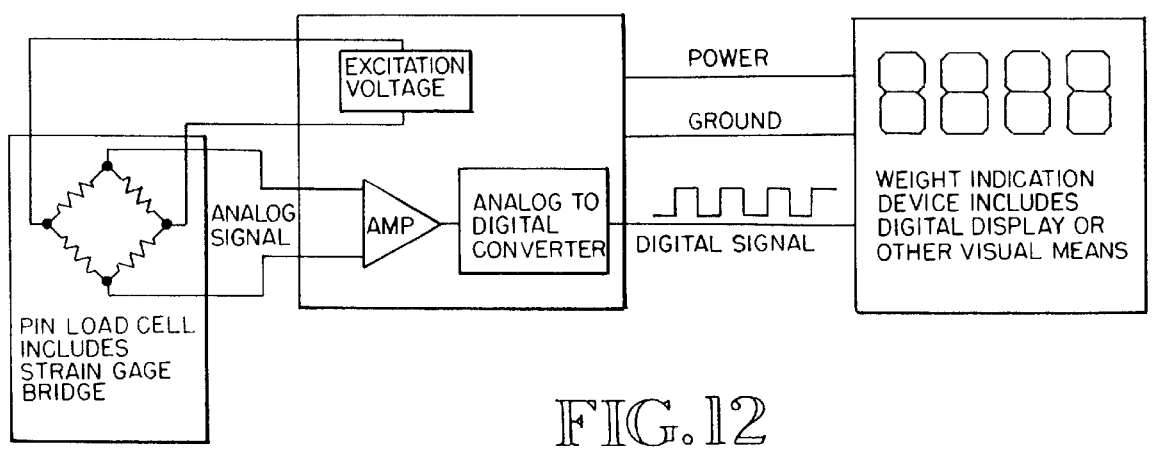
FIG. 12 is a schematic diagram of the preferred means for converting strain measurements into vehicle weight information and for displaying the same.

FIG. 12 is a schematic illustration of the preferred means for converting the electrical output of the shear strain measuring means of any of the three embodiments described above into meaningful information about vehicle weight and displaying that information. Essentially, each of the strain gages is wired into a strain gage bridge in a manner well known in the art and excitation voltage is applied to the bridge. Changes in shear loading in the shear web results in a change in resistance in the gage and a resultant change in the analog output from the bridge. That output is converted then from an analog to a digital signal by a converter and transmitted to a digital display or other visual means. Because a change in weight on the vehicle frame will result in a proportional change in output from the strain gage bridge this system, when properly calibrated, will provide an accurate indication of weight on each vehicle axle, weight on the tractor at its point of contact with the trailer, and total weight of the vehicle.

Thus it can be seen that the present invention provides for an improved trunnion mount single point suspension including a weight monitoring apparatus. It can also be seen that it provides for an improved weight monitoring apparatus for a truck tractor at its point of connection to a trailer. Clearly this invention incorporates many novel features and offers significant advantages over the prior art. Although only three embodiments of this invention have been illustrated and described it is to be understood that obvious modifications can be made of it without departing from the true scope and spirit of the invention.

I claim:

1. A single point vehicle suspension including a weight monitoring apparatus, the suspension comprising:
    a trunnion shaft;
    means for attaching the shaft to a vehicle frame;
    an axle spring assembly mounted to the trunnion shaft outboard of and spaced from the means for attaching; and,
    means mounted to the trunnion shaft intermediate the means for attaching and the axle spring assembly for measuring changes in shear strain in the shaft.

2. The suspension of claim 1 wherein the means for attaching includes a trunnion hanger mounted to the trunnion shaft inboard of the axle spring assembly.

3. The suspension of claim 1 wherein the means for attaching includes a clevis bracket having inner and outer arms each attached to the shaft and wherein the axle spring assembly is mounted to the shaft intermediate the arms.

4. The suspension of claim 3 wherein the measuring means includes a first measuring means disposed between the axle spring assembly and the inner arm.

5. The suspension of claim 3 wherein the measuring means includes a second measuring means disposed between the axle spring assembly and the outer arm.

6. The suspension of claim 1 wherein the trunnion shaft includes strain isolation means disposed between the axle spring assembly and the means for attaching.

7. The suspension of claim 1 wherein the means for measuring includes at least one electrical resistance strain gauge.

8. A single point vehicle suspension system including a weight monitoring apparatus, the suspension comprising:
    first and second spaced means for attaching a trunnion shaft to a vehicle frame;
    a trunnion shaft having a center portion extending between and attached to each of the first and second means for attaching the trunnion shaft and opposing first and second outboard end portions attached to the first and second means for attaching, respectively;
    first and second axle spring assemblies mounted on the first and second outboard end portions respectively, outboard of and spaced from the first and second attaching means, respectively;
    means mounted to the first outboard end portion intermediate to first means for attaching and the first axle spring assembly for measuring changes in shear strain in the shaft.

9. The suspension of claim 8 wherein the first means for attaching includes a trunnion hanger mounted to the first outboard end portion of the trunnion shaft inboard of the first axle spring assembly.

10. The suspension of claim 8 wherein the first means for attaching includes a clevis bracket having inner and outer arms, each attached to the first outboard end portion of the trunnion shaft, and wherein the first axle spring assembly is mounted to the first outboard end portion intermediate the arms.

11. The suspension of claim 10 wherein the measuring means includes a first measuring means disposed between the first axle spring assembly and the inner arm.

12. The suspension of claim 10 wherein the measuring means includes a second measuring means disposed between the first axle spring assembly and the outer arm.

13. The suspension of claim 8 wherein the measuring means includes an electrical resistance strain gauge.

14. The suspension of claim 10 wherein the first outboard portion of the trunnion shaft includes the first axle spring assembly and each of the inner and outer arms.

\* \* \* \* \*